United States Patent
Cheng

(10) Patent No.: US 10,128,679 B2
(45) Date of Patent: Nov. 13, 2018

(54) ADAPTIVE CHARGER WITH INPUT CURRENT LIMITATION AND CONTROLLING METHOD FOR THE SAME

(71) Applicant: Silergy Semiconductor Technology (Hangzhou) LTD, Hangzhou, ZheJiang Province (CN)

(72) Inventor: Shuai Cheng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 289 days.

(21) Appl. No.: 15/006,978

(22) Filed: Jan. 26, 2016

(65) Prior Publication Data
US 2016/0233713 A1    Aug. 11, 2016

(30) Foreign Application Priority Data

Feb. 11, 2015 (CN) .......................... 2015 1 0073401

(51) Int. Cl.
*H02J 7/02*    (2016.01)
*H02J 7/00*    (2006.01)

(52) U.S. Cl.
CPC .......... *H02J 7/0083* (2013.01); *H02J 7/0029* (2013.01); *H02J 2007/0039* (2013.01)

(58) Field of Classification Search
USPC ........................................................ 320/141
See application file for complete search history.

(56) References Cited

U.S. PATENT DOCUMENTS

| 6,137,267 A * | 10/2000 | Kates ................... H02J 7/0052 320/135 |
| 7,990,106 B2 * | 8/2011 | Hussain ................... H02J 7/06 320/128 |
| 9,075,422 B2 | 7/2015 | Vemula |
| 2014/0203763 A1 | 7/2014 | Zhao et al. |

FOREIGN PATENT DOCUMENTS

| CN | 1455306 A | 11/2003 |
| CN | 102223078 A | 10/2011 |

* cited by examiner

*Primary Examiner* — Robert Grant
(74) *Attorney, Agent, or Firm* — Michael C. Stephens, Jr.

(57) ABSTRACT

An adaptive charger can include: a power converter configured to receive an input current from an external power supply, and to generate an output current as a charging current to a load; a current feedback loop configured to compare a first detection signal that represents the input current against a first current reference signal, and to generate a first error signal, where the power converter is configured to regulate the input current according to the first error signal; and the current feedback loop being configured to determine an overload state of the external power supply according to an input voltage of the power converter, where the charger is configured to enter a current limit state when the external power supply is determined to be in the overload state, and where the first current reference signal is gradually reduced until the external power supply recovers to a non-overloaded state.

15 Claims, 11 Drawing Sheets

ADAPTIVE CHARGER WITH INPUT CURRENT LIMITATION AND CONTROLLING METHOD FOR THE SAME

RELATED APPLICATIONS

This application claims the benefit of Chinese Patent Application No. 201510073401.4, filed on Feb. 11, 2015, which is incorporated herein by reference in its entirety.

FIELD OF THE INVENTION

The present disclosure relates to the field of power supplies, and more particularly to adaptive chargers and associated controlling methods.

BACKGROUND

Switched-type chargers are widely used in the fields of smartphones, tablets, etc. due to its advantages of relatively small size, high efficiency, and fast charging speed. However, the output power and output current of a universal serial bus (USB) interface of an external power supply (e.g., an adapter, a computer, etc.) are usually limited. Generally, an external power supply may supply power for a switched-type charger during the battery charging process. The input current of the charger may be limited so as to avoid an overload condition when using an adapter or a USB power supply as a power source.

SUMMARY

In one embodiment, an adaptive charger having an input current limitation, can include: (i) a power converter configured to receive an input current from an external power supply, and to generate an output current as a charging current to a load; (ii) a current feedback loop configured to compare a first detection signal that represents the input current against a first current reference signal, and to generate a first error signal, where the power converter is configured to regulate the input current according to the first error signal; and (iii) the current feedback loop being configured to determine an overload state of the external power supply according to an input voltage of the power converter, where the charger is configured to enter a current limit state when the external power supply is determined to be in the overload state, and where the first current reference signal is gradually reduced until the external power supply recovers to a non-overloaded state.

In one embodiment, method of controlling an adaptive charger with an input current limitation, can include: (i) receiving an input current from an external power supply, and providing an output current as a charging current to a load via a power converter; (ii) generating a first error signal by comparing a first detection signal that represents an input current against a first current reference signal, and providing the first error signal to a power converter via a current feedback loop, where the power converter regulates the input current according to the first error signal; and (iii) determining the overload state of the external power supply according to an input voltage of the power converter, where when the external power supply is in the overload state, the charger enters a current limit state, and the first current reference signal is gradually reduced until the external power supply recovers to no longer be in the overload state.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
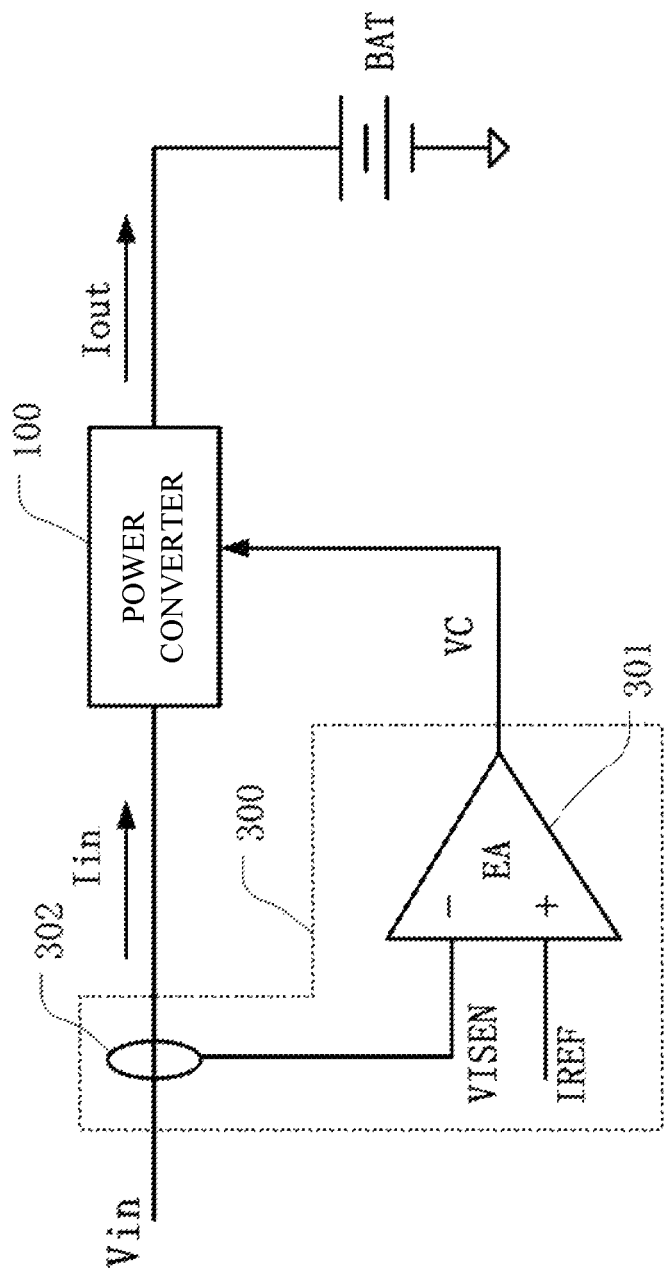
FIG. 1 is a schematic block diagram of an example adaptive charger with an input current limitation.

Referring now to FIG. 1, shown is a schematic block diagram of an example adaptive charger with an input current limitation. The charger may include power converter 100 for converting input voltage Vin to output voltage Vout and battery "BAT" as a load. In order to adaptively limit the input current, operational amplifier 301 in input current control loop 300 can compare sense signal VISEN of input current Iin against predetermined input current reference signal IREF. Operational amplifier 301 may generate error signal VC to control power converter 100. Power converter 100 may regulate output current Iout (e.g., the charging current of the battery), so as to limit input current Iin to the predetermined value. In the switched-type charger example of FIG. 1, a relatively small input current reference signal IREF can be set in order to prevent the input current of the switched-type charger from being too large. As a result, this approach may not make best use of an external power supply to output a current, and to improve the battery charging speed.

Figure 2:
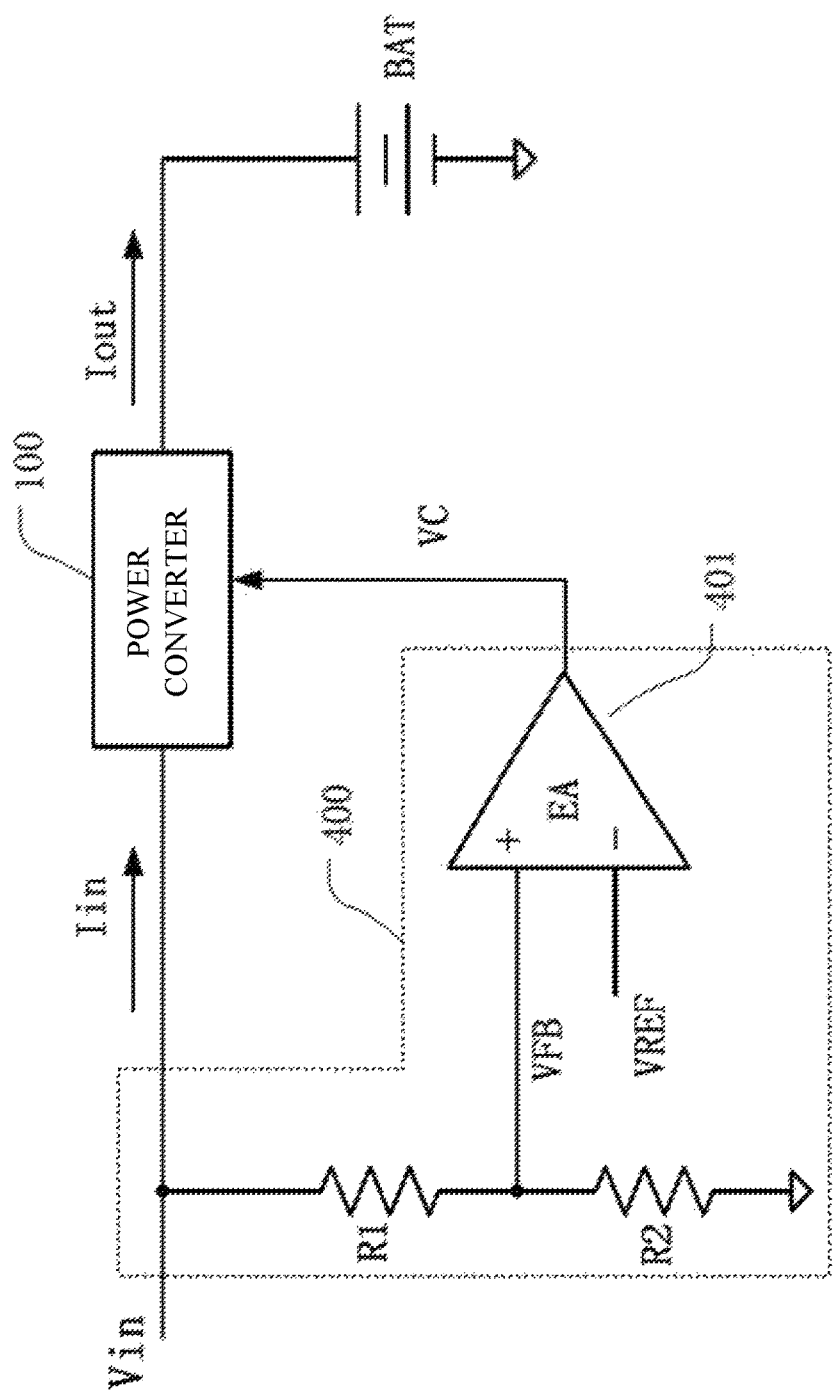
FIG. 2 is a schematic block diagram of another example adaptive charger with an input current limitation.

Referring now to FIG. 2, shown is a schematic block diagram of another example adaptive charger with an input current limitation. In this example, in order to adaptively limit the input current, comparator 401 in input voltage control loop 400 can compare sense signal VFB of input voltage Vin against predetermined input voltage reference signal VREF. Comparator 401 can generate error signal VC to control power converter 100. When error signal VC indicates that the present input voltage has dropped to a certain predetermined value, power converter 100 can reduce output current Iout (e.g., the charging current of the battery), so as to reduce input current Iin, and to make sure that the input voltage may not be further reduced. In the switched-type charger of FIG. 2, though the ability of an external power supply to output current may be optimized, the former external power supply (e.g., an adapter) may be overloaded for a relatively long time, and as a result the lifetime may be shortened because of overheating.

In one embodiment, an adaptive charger having an input current limitation, can include: (i) a power converter configured to receive an input current from an external power supply, and to generate an output current as a charging current to a load; (ii) a current feedback loop configured to compare a first detection signal that represents the input current against a first current reference signal, and to generate a first error signal, where the power converter is configured to regulate the input current according to the first error signal; and (iii) the current feedback loop being configured to determine an overload state of the external power supply according to an input voltage of the power converter, where the charger is configured to enter a current limit state when the external power supply is determined to be in the overload state, and where the first current reference signal is gradually reduced until the external power supply recovers to a non-overloaded state.

Figure 3:
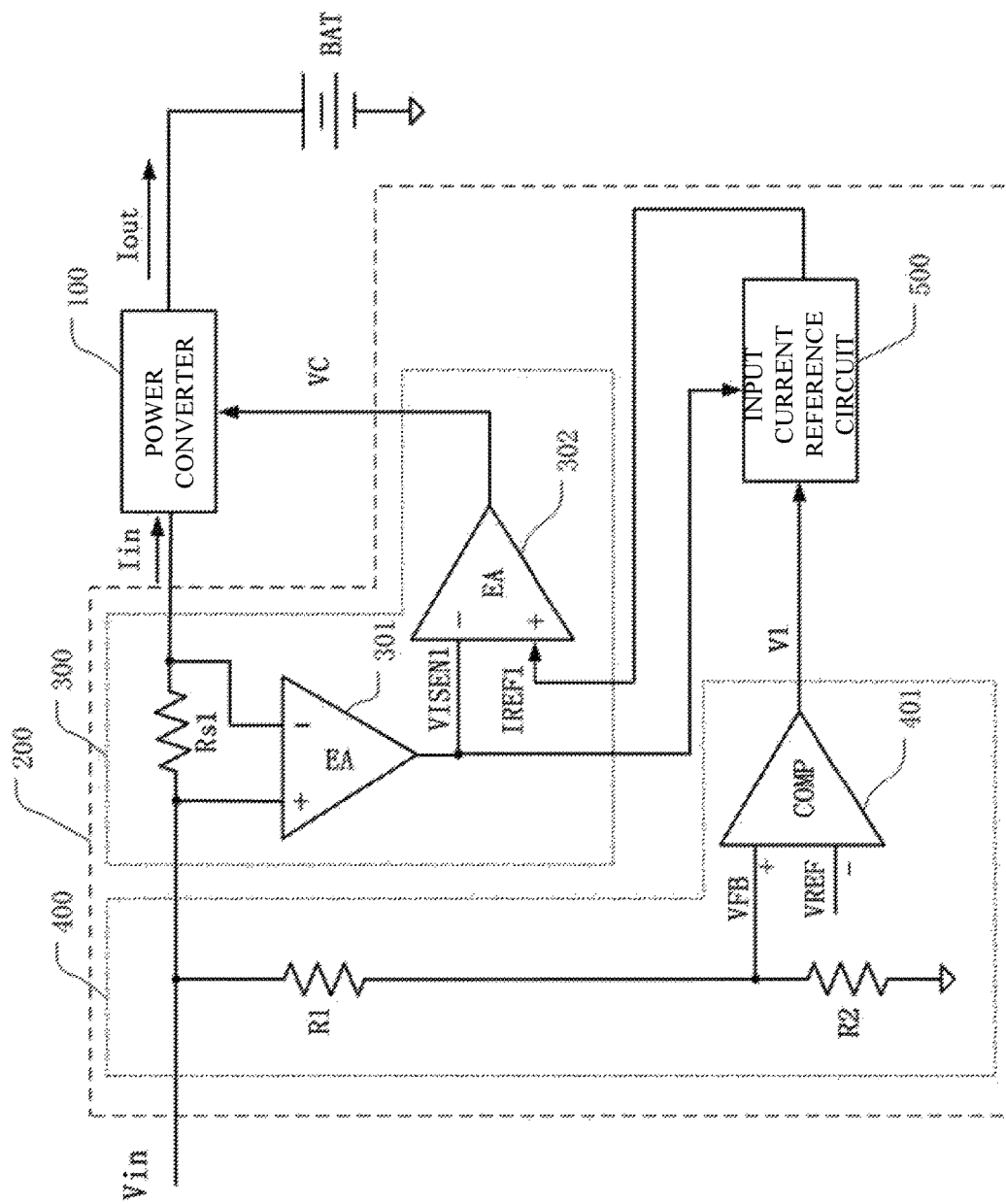
FIG. 3 is a schematic block diagram of a first example adaptive charger with an input current limitation, in accordance with embodiments of the present invention.

Referring now to FIG. 3, shown is a schematic block diagram of a first example adaptive charger with an input current limitation, in accordance with embodiments of the present invention. The charger may include power converter 100 and input current control loop 200. Power converter 100 can receive input voltage Vin from an external power supply (e.g., an adapter, a USB interface of a computer, etc.), and may generate stable output voltage Vout. The battery "BAT" can be a rechargeable battery, and may receive a charging current from power converter 100.

Power converter 100 can be any suitable topology, such as BOOST topology, BUCK topology, BUCK-BOOST topology, etc., and may include a controlling circuit, a power switch, and a low-pass filter. The controlling circuit can generate a pulse-width modulation (PWM) signal, such that the power switch can be periodically turned on/off in order to "chop" the input voltage. A DC output voltage may then be obtained via the low-pass filter. Output voltage Vout and output current Iout of power converter 100 can be regulated by adjusting the duty cycle of the control signal (e.g., gate control) of the power switch.

Input current control loop 200 can include input current regulating circuit 300, input voltage detecting circuit 400, and input current reference circuit 500. Input current regulating circuit 300 can include sampling resistor Rs1, operational amplifier 301, and operational amplifier 302. Sampling resistor Rs1 can connect to an input terminal of power converter 100, such that input current Iin of power converter 100 may flow through sampling resistor Rs1. The high potential end of sampling resistor Rs1 can connect to the non-inverting input terminal of operational amplifier 301, and the low potential end of the sampling resistor Rs1 can connect to the inverting input terminal of operational amplifier 301. Detecting signal VISEN1 that represents input current Iin can be generated at the output terminal of operational amplifier 301 by receiving the voltage drop across sampling resistor Rs1 at the input terminals of operational amplifier 301. Operational amplifier 302 can receive sense signal VISEN1 at its inverting input terminal, and current reference signal IREF1 at its non-inverting input terminal, and may generate error signal VC by comparison. Error signal VC can also be provided to power converter 100, so as to controllably generate a PWM signal, and to regulate an output current of power converter 100 according to error signal VC.

Input voltage detecting circuit 400 may include a resistance voltage divider made up of resistors R1 and R2, and comparator 401. Resistors R1 and R2 can connect in series between an input terminal of power converter 100 and ground. Also, a common node of resistors R1 and R2 can be configured as input voltage feedback signal VFB. Comparator 401 receives input voltage feedback signal VFB at its non-inverting input terminal, and reference voltage VREF at its inverting input terminal, and may generate voltage signal V1 by comparison. Input current reference circuit 500 can receive voltage signal V1 as an enable signal, and may generate current reference signal IREF1 according to input current Iin when voltage signal V1 enables input current reference circuit 500. In subsequent controlling cycles, power converter 100 can regulate the duty cycle of the PWM signal according to error signal VC, so as to limit input current Iin.

In this example charger, current reference signal IREF1 can be generated in accordance with input voltage Vin and input current Iin, in order to determine if the charger enters the current limit state according to input voltage Vin and input current Iin. In the current limit state, error signal VC can regulate the duty cycle of the PWM signal by power converter 100. For example, when input current Iin of the charger is overloaded, the duty cycle of the PWM signal may be reduced, in order to reduce the charging current, and to accordingly reduce input current Iin. The charger may be configured to limit the input current of the charger by regulating current reference signal IREF1.

If input voltage detecting circuit 400 detects that input voltage Vin has decreased to a level of reference voltage VREF1, this can indicate that present input current Iin is the maximum output current of the external power supply. Input current Iin should be limited to be slightly lower than present input current Iin in order to prevent the external power supply from being overloaded. Therefore, the current reference signal can be set as IREF1=Iin−ΔI. By selecting the current regulation step length ΔI, the charger can optimize the current output performance of the external power supply in order to prevent the external power supply from being overloaded for a relatively long time.

If input voltage detecting circuit 400 detects that input voltage Vin has not decreased to a level of reference voltage VREF1, this may indicate that present input current Iin may not cause the external power supply to be overloaded. Thus, the input current may not be limited to fully optimize the current output performance of the external power supply even though the input current is rising. In an alternative example, another maximum reference can be set for input current Iin, so as to fully optimize the current output performance of the external power supply when the external power supply is not overloaded. This can substantially prevent the conversion efficiency of power converter 100 from being lowered due to a relatively or too large input current Iin. In this way, the charger can adaptively regulate the input current according to a practical load capacity of the external power supply, which may improve charging efficiency and the safety and lifetime of the external power supply.

Figure 4:
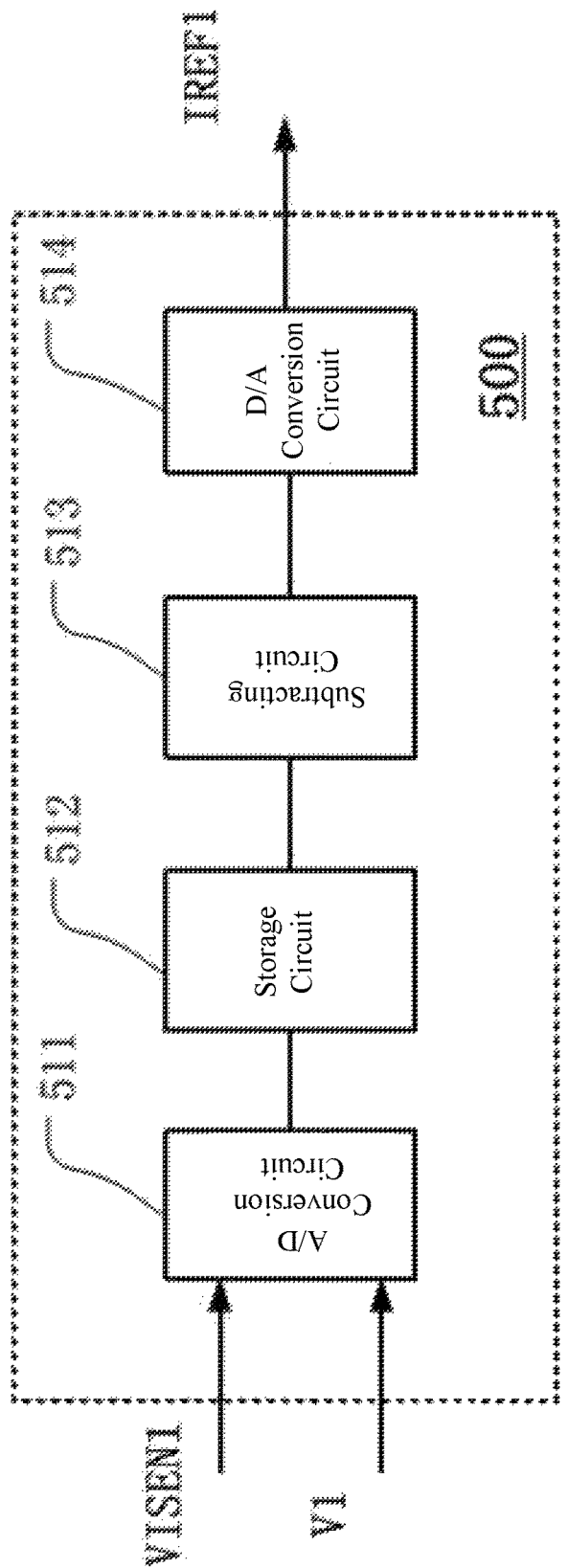
FIG. 4 is a schematic block diagram of a first example input current reference circuit used in the charger of FIG. 3, in accordance with embodiments of the present invention.

Referring now to FIG. 4, shown is a schematic block diagram of a first example input current reference circuit used in the charger of FIG. 3, in accordance with embodiments of the present invention. This particular example input current reference circuit 500 may include A/D conversion circuit 511, storage circuit 512, subtracting circuit 513, and D/A conversion circuit 514. A/D conversion circuit 511 can receive detection signal VISEN1 that may represent input current Iin at its input terminal, and voltage signal V1 at its enable terminal. As described above, voltage signal V1 may be used to indicate if input voltage Vin is greater than reference voltage VREF. When the external power supply is not overloaded, voltage signal V1 may be low to disable A/D conversion circuit 511. When the external power supply is overloaded, the charger can enter the current limit state, voltage signal V1 may be high to enable A/D conversion circuit 511, and A/D conversion circuit 511 may generate a first digital value to represent present input current Iin.

Storage circuit 512 may be used to store a second digital value. When the external power supply is not overloaded, the second digital value stored in the storage circuit 512 can correspond to predetermined maximum value Iin_max of the input current. Though voltage signal V1 may not enable A/D conversion circuit 511, the maximum value of the current reference signal may still be limited by the predetermined maximum value, so as to protect the charger in a case when input current Iin is too large. When the external power supply is overloaded, the charger may enter the current limit state, and storage circuit 512 may store the first digital value that represents present input current Iin obtained from A/D conversion circuit 511. The second digital value stored in storage circuit 512 can correspond to the first digital value in the overload state. When the external power supply recovers so as to not be overloaded from the overload state, the second digital value stored in storage circuit 512 can correspond to the first digital value in the last overload state.

Subtracting circuit 513 can subtract predetermined current regulation step length ΔI from voltage signal V3, in order to obtain a third digital value. D/A conversion circuit 514 can convert the third digital value to an analog signal, and may provide current reference signal IREF1 for a next control cycle. Input current reference circuit 500 may generate current reference signals IREF1 of different values in different states. When the external power supply is not overloaded, current reference signal IREF1 can be represented as:

$$IREF1=Iin\_max-\Delta I \quad (1)$$

Iin_max can represent the predetermined maximum value of input current, ΔI may represent the current regulation step length, where the predetermined maximum value is a constant. When the external power supply is overloaded, input voltage Vin can be reduced to reference voltage VREF1. When the charger enters the current limit state, the input current reference circuit 500 can generate current reference signal IREF1 for a next control cycle according to present input current Iin, which can be represented as:

$$IREF1=Iin-\Delta I \quad (2)$$

Iin can represent a first detecting signal of present input current Iin, and ΔI may represent the current regulation step length. Input current reference circuit 500 can reduce current reference signal IREF1 by current regulation step length ΔI from present input current Iin, so as to reduce input current Iin in a next control cycle. After the charger enters the current limit state, when input voltage Vin rises to a level of reference voltage VREF1, this can indicate that the external power supply recovers to a non-overloaded state, and the charger may be out of current limit state. Storage circuit 512 can store the first digital value in the last overload state, current reference signal IREF1 can remain unchanged, and input current Iin can remain relatively close to the maximum value when the external power supply is not overloaded. In an alternative example, storage circuit 512 and subtracting circuit 513 can exchange their positions.

Figure 5:
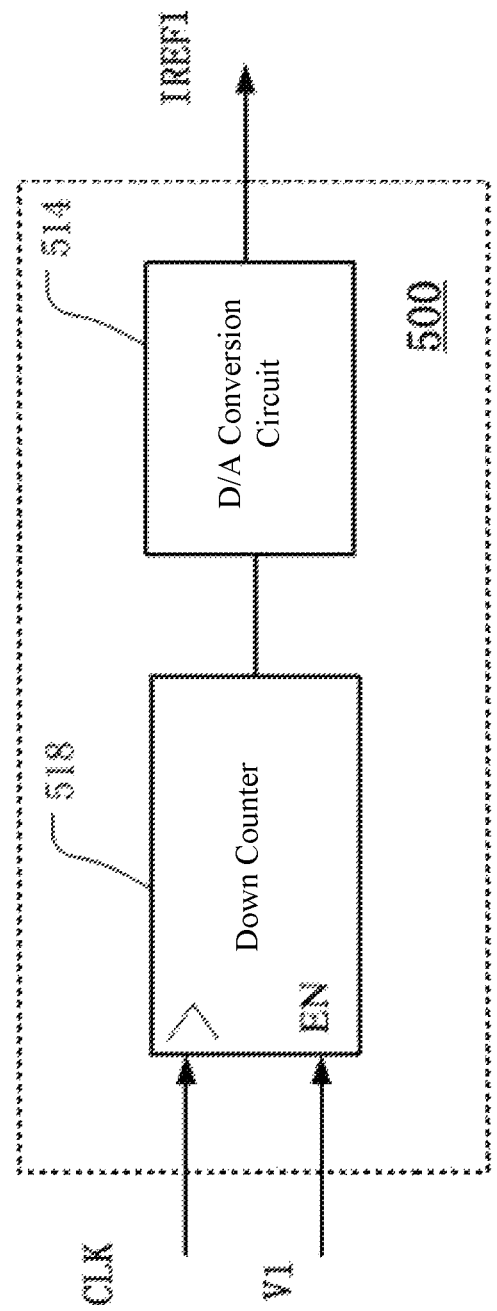
FIG. 5 is a schematic block diagram of a second example input current reference circuit used in the charger of FIG. 3, in accordance with embodiments of the present invention.

Referring now to FIG. 5, shown is a schematic block diagram of a second example input current reference circuit used in the charger of FIG. 3, in accordance with embodiments of the present invention. Input current reference circuit 500 may include down counter 518 and D/A conversion circuit 514. Down counter 518 can receive clock signal CLK at its input terminal, and voltage signal V1 at its enable terminal, and may generate the first digital value at its output terminal. When the external power supply is not overloaded, voltage signal V1 can be low in order to disable the down counter 518. When the external power supply is overloaded, the charger may enter a current limit state, and voltage signal V1 be high in order to enable down counter 518. Down counter 518 can perform one subtract counting operation to generate a digital control signal at each pulse of the clock signal. When the external power supply recovers to a non-overloaded state from the overload state, down counter 518 may stop performing the subtract operation.

D/A conversion circuit 514 can convert the first digital value to an analog signal, and may provide current reference signal IREF1 for a next control cycle. Input current reference circuit 500 may generate current reference signals IREF1 of different values in different states. When the external power supply is not overloaded, current reference signal IREF1 can be represented as:

$$IREF1=Iin\_max=N*\Delta I \quad (3)$$

Iin_max may represent a predetermined maximum value of the input current, N may represent a predetermined maximum value of the down counter, and ΔI may represent a current regulation step length, where the predetermined maximum value is a constant. When the external power supply is overloaded, the charger can enter the current limit state, and input voltage Vin may be reduced to a level of reference voltage VREF1. Input current reference circuit 500 can generate current reference signal IREF1 for a next control cycle according to present input current Iin, which can be represented as:

$$IREF1=(N-i)*\Delta I \quad (4)$$

Here, i can represent a number of clock pulses since the charger has entered a current limit state, and ΔI may represent the current regulation step length. Input current reference circuit 500 can reduce current reference signal IREF1 by current regulation step length ΔI from predetermined maximum value Iin_max of the input current in each clock period. After the charger enters the current limit state, when input voltage Vin rises to a level of reference voltage VREF1, this can indicate that the external power supply has recovered to a non-overloaded state, and the charger may thus be out of the current limit state. Down counter 518 can stop the subtract counting operation, and current reference signal IREF1 may remain unchanged such that input current Iin is maintained relatively close to the maximum value when the external power supply is not overloaded. In this way, the charging current of the charger can be regulated via digital control such that the input current of the charger may be limited.

Figure 6:
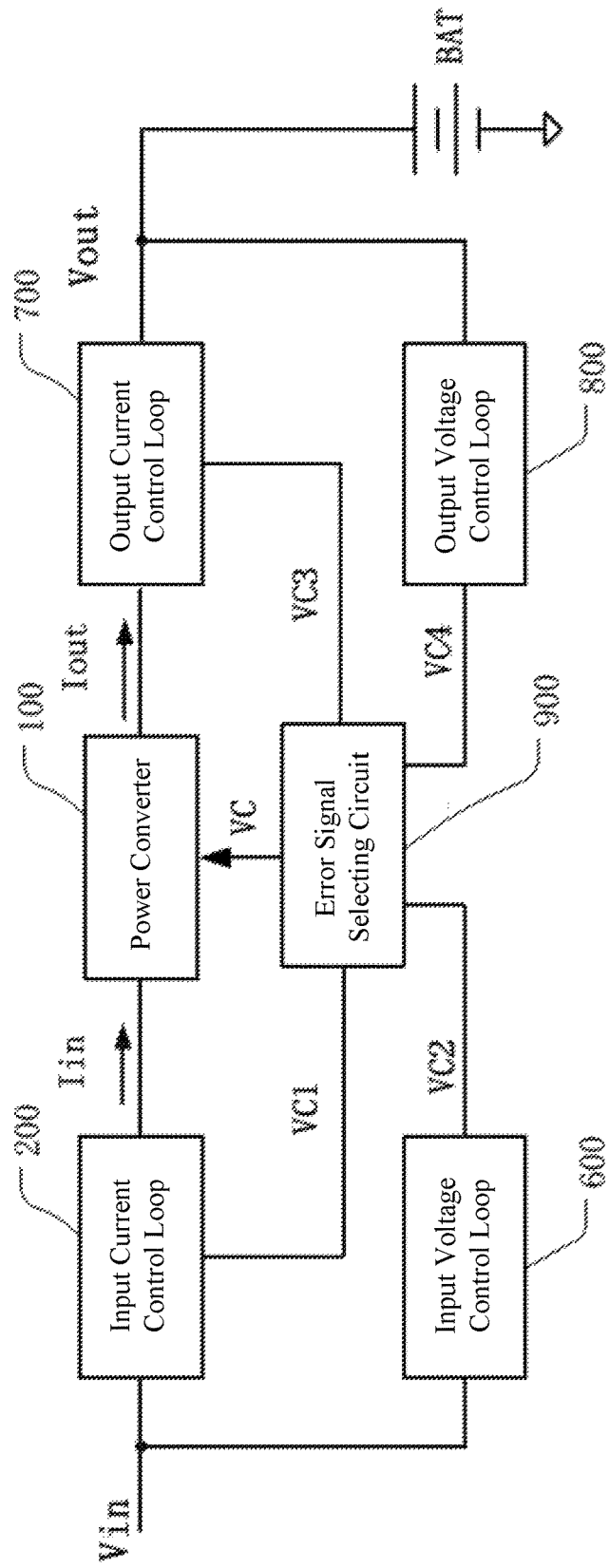
FIG. 6 is a schematic block diagram of a second example adaptive charger with an input current limitation, in accordance with embodiments of the present invention.

Referring now to FIG. 6, shown is a schematic block diagram of a second example adaptive charger with an input current limitation, in accordance with embodiments of the present invention. This example charger may include power converter 100, input current control loop 200, input voltage control loop 600, output current control loop 700, output voltage control loop 800, and error signal selecting circuit 900. The battery can be rechargeable, and may receive a charging current from power converter 100.

Referring back to FIG. 3, input current control loop 200 may include input current regulating circuit 300, input voltage detecting circuit 400, and input current reference circuit 500. Input current control loop 200 can detect input voltage Vin and input current Iin. Input current control loop 200 can compare a detecting signal of the input current Iin and current reference signal IREF1, and may generate error signal VC1. When the external power supply is not overloaded, current reference signal IREF1 can be the predetermined value of the input current. When the external power supply is overloaded, the charger may enter the current limit state, input voltage Vin can be reduced to a level of the reference voltage, and current reference signal IREF1 may be the difference between the present input current and the current regulation step length. When the charger is out of the current limit state, input voltage Vin can be increased to a level of the reference voltage, and current reference signal IREF1 may be the difference between the input current and the current regulation step length prior to being out of the current limit state.

Input current control loop 200 can provide error signal VC1 to the control circuit of power converter 100, so as to regulate the duty cycle of the PWM signal. Input current control loop 200 can maintain input current Iin be relatively close to the maximum value when the external power supply is not overloaded. For example, when input current Iin of the charger is overloaded, current reference signal IREF1 can be reduced, and the control circuit of the power converter 100 may be reduced to the duty cycle of the PWM signal, so as to reduce the charging current and to accordingly reduce input current Iin. The charger may be configured to limit the input current of the charger by regulating current reference signal IREF1.

Figure 7A:
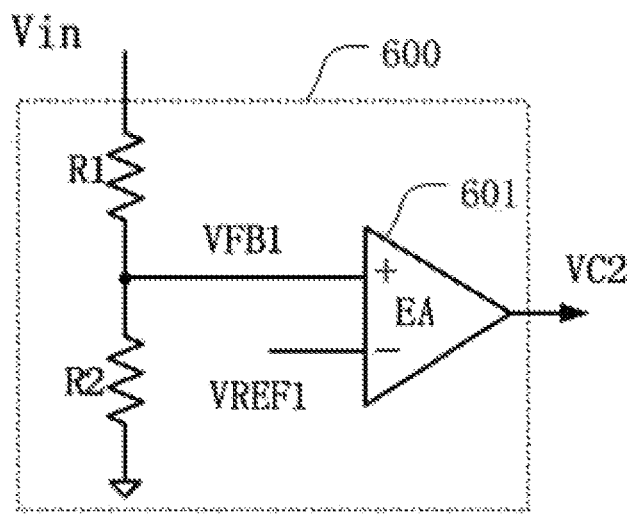
FIGS. 7A-7D are schematic block diagrams of an input voltage control loop, an output voltage control loop, an output current control loop, and an error signal selection circuit used in the charger of FIG. 6, in accordance with embodiments of the present invention.

Referring now to FIGS. 7A-7D, shown are schematic block diagrams of an input voltage control loop, an output voltage control loop, an output current control loop, and an error signal selection circuit used in the charger of FIG. 6, in accordance with embodiments of the present invention. In the example of FIG. 7A, input voltage control loop 600 may include a resistance voltage divider made up of resistors R1 and R2, and operational amplifier 601. Resistors R1 and R2 can connect in series between an input terminal of power converter 100 and ground, and a common node of resistors R1 and R2 can be configured as input voltage feedback signal VFB1. Operational amplifier 601 can receive input voltage feedback signal VFB1 at its non-inverting input terminal, and reference voltage VREF1 at its inverting input terminal, and may generate error signal VC2 by comparison.

Input voltage control loop 600 can provide error signal VC2 to the control circuit of power converter 100, so as to regulate the duty cycle of the PWM signal. The input voltage control loop 600 can maintain input voltage Vin to be a value corresponding to reference voltage VREF1. For example, when input voltage Vin of the charger deviates from the reference value, error signal VC2 can increase. The control circuit of power converter 100 may regulate the duty cycle of the PWM signal in order to reduce error signal VC2. The charger can maintain the input voltage of the charger as substantially constant via a feedback control loop.

Figure 7B:
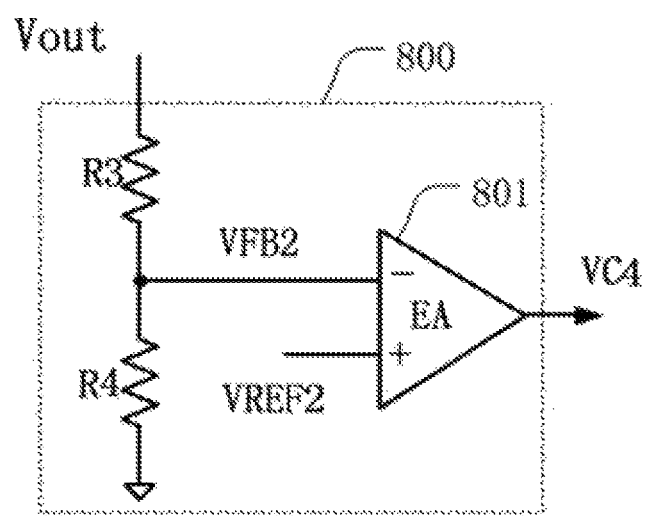

In FIG. 7B, output voltage control loop 800 may include a resistance voltage divider made up of resistors R3 and R4, and operational amplifier 801. Resistors R3 and R4 can connect in series between an output terminal of power converter 100 and ground, and a common node of resistors R3 and R4 can be configured as input voltage feedback signal VFB2. Operational amplifier 801 can receive input voltage feedback signal VFB2 at its inverting input terminal, and reference voltage VREF2 at its non-inverting input terminal, and may generate error signal VC4 by comparison.

Output voltage control loop 800 can provide error signal VC4 to the control circuit of power converter 100, so as to regulate the duty cycle of the PWM signal. Output voltage control loop 800 can maintain output voltage Vout to be a value corresponding to reference voltage VREF2. For example, when output voltage Vout of the charger deviates from the reference value, error signal VC4 can increase. The control circuit of power converter 100 may regulate the duty cycle of the PWM signal in order to reduce error signal VC4. The charger can maintain output voltage Vout of the charger as substantially constant via a feedback control loop.

Figure 7C:
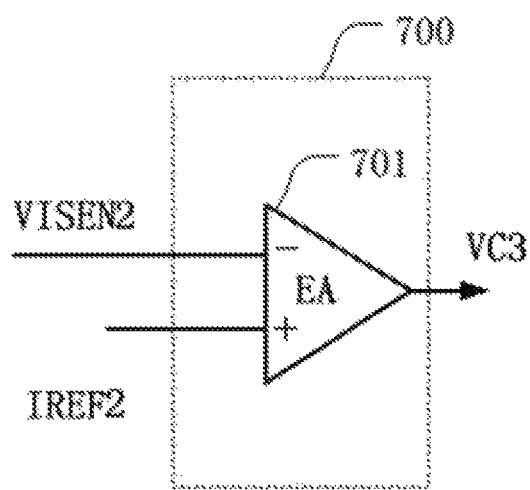

In FIG. 7C, output current control loop 700 may include operational amplifier 701. Also, input current control loop 700 may include a sampling circuit. For example, the sampling circuit may include a sampling resistor connected to an input terminal of power converter 100, with two terminals of the sampling resistor being respectively connected to the non-inverting and the inverting input terminals of the operational amplifier. The output terminal of the operational amplifier can generate detection signal VISEN2 that represents output current Iout by sampling the voltage drop across the sampling resistor. Operational amplifier 701 can receive sense signal VISEN2 at its inverting input terminal, and current reference signal IREF2 at its non-inverting input terminal, and may generate error signal VC3 by comparison.

Output current control loop 700 can provide error signal VC3 to the control circuit of power converter 100, so as to regulate the duty cycle of the PWM signal. Output current control loop 700 can maintain output current Iout be a value corresponding to current reference signal IREF2. For example, when output current Iout of the charger deviates from the reference value, error signal VC3 can increase. The control circuit of power converter 100 can regulate the duty cycle of the PWM signal in order to reduce error signal VC3. The charger can maintain output current Tout of the charger as substantially constant via a feedback control loop.

Figure 7D:
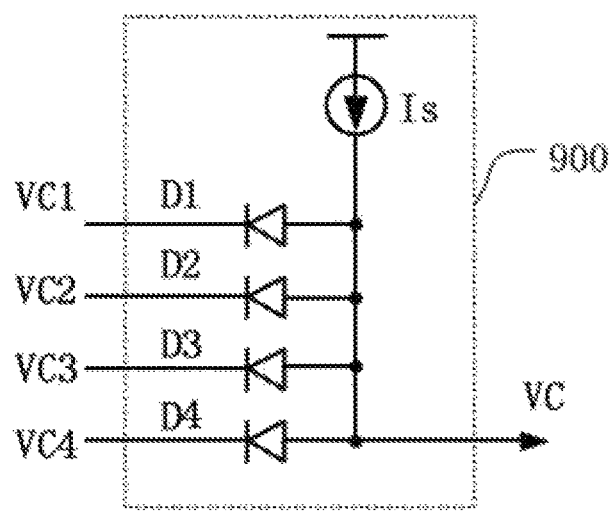

In the example of FIG. 7D, error signal selecting circuit 900 may include diodes D1-D4, and current source Is. The cathodes of diode D1-D4 can receive respective error signals VC1-VC4, and the anodes thereof can connect at a common node to provide error signal VC. The output terminal of current source Is can also connect to this common node. When any of diodes D1-D4 is on/conducting, a voltage at the common node may be approximately clamped at the cathode voltage of a corresponding diode. Therefore, error signal selecting circuit 900 can receive error signals VC1-VC4, and may select the minimum value as error signal VC. Furthermore, error signal selecting circuit 900 can provide error signal VC to power converter 100, to control generation of the PWM signal. The charger can regulate the PWM signal of power converter 100 according to error signal VC, so as to keep at least one of the input current, input voltage, output voltage and output current of the charger to be substantially constant.

In one embodiment, method of controlling an adaptive charger with an input current limitation, can include: (i) receiving an input current from an external power supply, and providing an output current as a charging current to a load via a power converter; (ii) generating a first error signal by comparing a first detection signal that represents an input current against a first current reference signal, and providing the first error signal to a power converter via a current feedback loop, where the power converter regulates the input current according to the first error signal; and (iii) determining the overload state of the external power supply according to an input voltage of the power converter, where when the external power supply is in the overload state, the charger enters a current limit state, and the first current reference signal is gradually reduced until the external power supply recovers to no longer be in the overload state.

Figure 8:
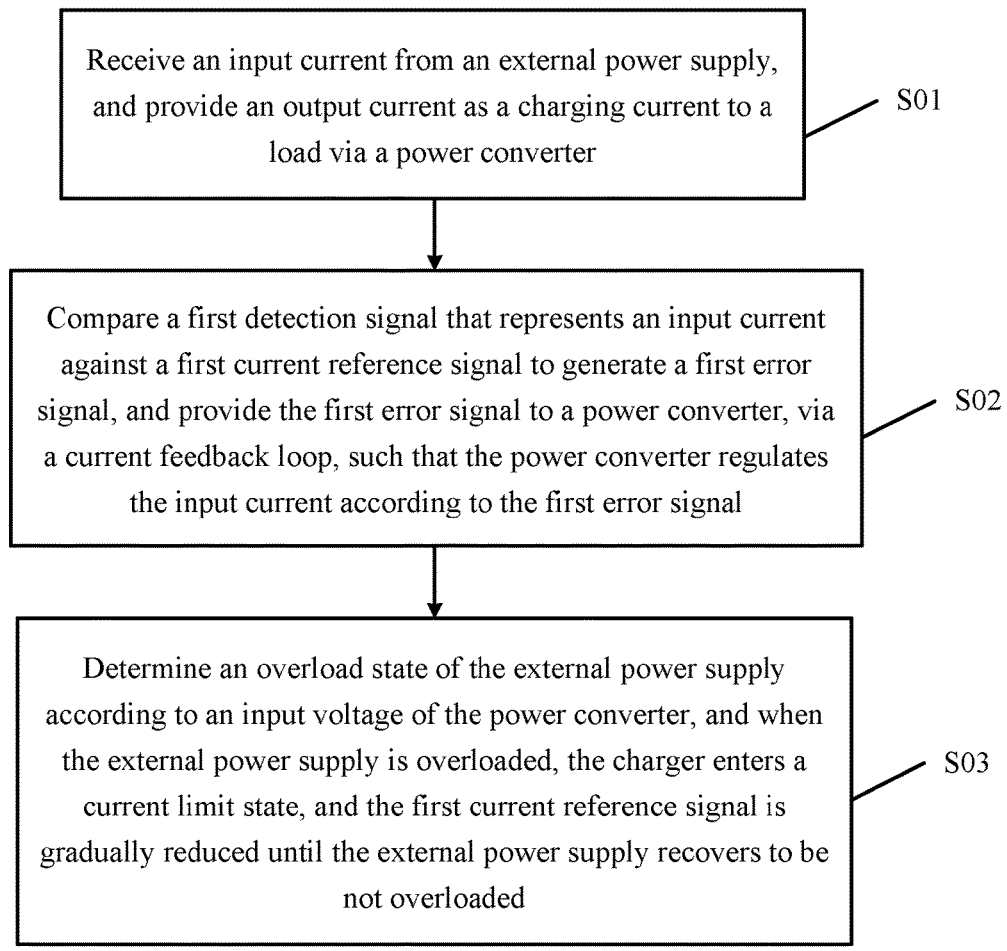
FIG. 8 is a flow diagram of an example method of controlling an adaptive charger with an input current limitation, in accordance with embodiments of the present invention.

Referring now to FIG. 8, shown is a flow diagram of an example method of controlling an adaptive charger with an input current limitation, in accordance with embodiments of the present invention. At S01, an input current (e.g., Iin) can be received from an external power supply (e.g., Vin), and an output current (e.g., Iout) can be provided as a charging current to a load (e.g., a rechargeable battery) via a power converter (e.g., 100). At S02, a first detection signal (e.g., VISEN1) that represents the input current can be compared against a first current reference signal (e.g., IREF1) to generate a first error signal (e.g., VC), and the first error signal can be provided to the power converter, via a current feedback loop, such that the power converter may regulate the input current according to the first error signal.

For example, generating the first error signal can include comparing the first detection signal that represents the input current against the first current reference signal to generate the first error signal, comparing a second detection signal (e.g., VFB) that represents the input voltage against a first reference voltage (e.g., VREF) to generate a first voltage signal (e.g., V1), and generating the first current reference signal according to the input voltage and the input current. In this way, it can be determined whether the external power supply is not overloaded when the second detection signal is greater than the first reference voltage, and the first current reference signal remains unchanged, and that the external power supply is overloaded when the second detection signal is less than the first reference voltage, and the first current reference signal is reduced.

For example, generating the first current reference signal can include, when the external power supply is not overloaded, obtaining the first current reference signal for a next control cycle according to a pre-stored digital value (e.g., 512). When the external power supply is overloaded, a current regulation step length can be subtracted (e.g., 513) from the present first detection signal, in order to obtain the first current reference signal for a next control cycle. For example, generating the first current reference signal can include, when the external power supply is not overloaded, obtaining the first current reference signal for a next control cycle according to the counting value stored in a down counter (e.g., 518). When the external power supply is overloaded, a subtraction counting operation can be performed by the down counter in each clock cycle to obtain the first current reference signal for a next control cycle.

At S03, the overload state of the external power supply can be determined according to the input voltage of the power converter. When the external power supply is overloaded, the charger can enter the current limit state, and the first current reference signal may be gradually reduced until the external power supply recovers to a non-overloaded state.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An adaptive charger having an input current limitation, the charger comprising:
   a) a power converter configured to receive an input voltage and an input current from an external power supply, and to generate an output current as a charging current to a load;
   b) an input voltage detection circuit configured to generate a first voltage signal by comparing a first reference voltage against a first detection signal that represents said input voltage, and to determine an overload state of said external power supply;
   c) an input current reference circuit configured to generate a first current reference signal according to a second detection signal that represents said input current when said external power supply is determined to be in said overload state; and
   d) an input current regulating circuit configured to regulate said input current in accordance with said first current reference signal when said external power supply is determined to be in said overload state in order to exit said overload state to make said input current become less than a maximum value drawn from said external power supply.

2. The charger of claim 1, wherein said power converter comprises a power switch that is controlled by a pulse-width modulation (PWM) signal to regulate said input current of said power converter.

3. The charger of claim 1, wherein:
   a) said input current regulating circuit is configured to compare said second detection signal against said first current reference signal, and to generate a first error signal;
   b) wherein said input current reference circuit is configured to maintain said first current reference signal when said first detection signal is greater than said first reference voltage, and said external power supply is determined to not be in said overload state; and
   c) said external power supply is determined to be in said overload state when said first detection signal is less than said first reference voltage.

4. The charger of claim 3, wherein said input current regulating circuit comprises:
   a) a first sampling resistor coupled to an input terminal of said power converter, wherein said input current flows through said first sampling resistor;
   b) a first operational amplifier having a non-inverting input terminal coupled to a high potential end of said first sampling resistor, an inverting input terminal coupled to a low potential end of said first sampling resistor, and an output terminal configured to provide said second detection signal; and
   c) a second operational amplifier having an inverting input terminal configured to receive a second detection signal, a non-inverting input terminal configured to receive said first current reference signal, and an output terminal to configured to provide said first error signal.

5. The charger of claim 1, wherein said input voltage detection circuit comprises:
   a) a resistance voltage divider having first and second resistors coupled in series between said input terminal of said power converter and ground, wherein a common node of said first and second resistors is configured as said first detection signal; and
   b) a first comparator having a non-inverting input terminal configured to receive said first detection signal, an inverting input terminal configured to receive said first voltage signal, and an output terminal configured to provide said voltage signal.

6. The charger of claim 1, wherein said input current reference circuit comprises:
   a) an A/D conversion circuit having an input terminal configured to receive said second detection signal, an enable terminal configured to receive said first voltage signal, and an output terminal configured to provide a first digital value that represents said second detection signal, wherein said first voltage signal is configured to disable said A/D conversion circuit when said external power supply is not in said overload state, and to enable said A/D conversion circuit when said external power supply is in said overload state;
   b) a storage circuit configured to receive said first digital value, and to store a second digital value corresponding to said first current reference signal;
   c) a subtracting circuit configured to subtract a current regulation step length from said second digital value to generate a third digital value; and
   d) a D/A conversion circuit configured to convert said third digital value to an analog signal, and to generate said first current reference signal for a next control cycle, wherein said second digital value corresponds to a predetermined value of said first current reference signal when said external power supply is not in said overload state, said second digital value corresponds to said first digital value in a present overload state when said external power supply is in said overload state, and wherein said second digital value corresponds to said first digital value in a last overload state when said external power supply recovers to no longer be in said overload state.

7. The charger of claim 3, wherein said input current reference circuit comprises:
   a) an A/D conversion circuit having an input terminal configured to receive said second detection signal, an enable terminal configured to receive said first voltage signal, and an output terminal configured to provide a first digital value that represents said second detection signal, wherein said first voltage signal is configured to disable said A/D conversion circuit when said external power supply is not in said overload state, and to enable said A/D conversion circuit when said external power supply is in said overload state;
   b) a subtracting circuit configured to subtract a predetermined current regulation step length from said first digital value to generate a second digital value;
   c) a storage circuit configured to store a third digital value that corresponds to said first current reference signal; and
   d) a D/A conversion circuit configured to convert said third digital value to an analog signal, and to generate said first current reference signal for a next control cycle, wherein said third digital value corresponds to a predetermined value of said first current reference signal when said external power supply is not in said overload state, said third digital value corresponds to said second digital value in a present overload state when said external power supply is not in said overload state, and wherein said third digital value corresponds to said second digital value in a last overload state when said external power supply recovers to no longer be in said overload state.

8. The charger of claim 3, wherein said input current reference circuit comprises:
   a) a down counter having an input terminal configured to receive a clock signal, an enable terminal configured to receive said first voltage signal, and an output terminal configured to provide a first digital value, wherein said first voltage signal is configured to disable said down counter when said external power supply is not in said overload state, and to enable said A/D conversion circuit when said external power supply is in said overload state; and
   b) a D/A conversion circuit configured to convert said first digital value to an analog signal, and to generate said first current reference signal for a next control cycle, wherein said first digital value corresponds to a predetermined maximum value of said down counter when said external power supply is not in said overload state, said down counter performs a subtraction operation in each clock cycle when said external power supply is in said overload state, and wherein said down counter stops performing said subtraction operation when said external power supply recovers to no longer be in said overload state.

9. The charger of claim 1, further comprising:
   a) an input voltage control loop configured to compare a third detection signal that represents an input voltage against a second reference voltage, and to generate a second error signal, wherein said power converter is configured to regulate said input voltage according to said second error signal;
   b) an output voltage control loop configured to compare a fourth detection signal that represents an output voltage against a third reference voltage, and to generate a third error signal, wherein said power converter is configured to regulate said output voltage according to said third error signal; and
   c) an output current control loop configured to compare a fifth detection signal that represents an output current against a second current reference signal, and to generate a fourth error signal, wherein power converter is configured to regulate said output current according to said fourth error signal.

10. The charger of claim 9, wherein said charger further comprises an error signal selecting circuit configured to select a minimum value from said first, second, third, and fourth error signals for said power converter, wherein said power converter is configured to regulate one of said input current, said input voltage, said output current and said output voltage according to said minimum value.

11. The charger of claim 10, wherein said error signal selecting circuit comprises:
   a) a current source having an output terminal coupled to a common node;
   b) a first diode having a cathode coupled to said first error signal, and an anode coupled to said common node;
   c) a second diode having a cathode coupled to said second error signal, and an anode coupled to said common node;

d) a third diode having a cathode coupled to said third error signal, and an anode coupled to said common node; and e) a fourth diode having a cathode coupled to said fourth error signal, and an anode coupled to said common node.

12. A method of controlling an adaptive charger with an input current limitation, the method comprising:

a) receiving an input voltage and an input current from an external power supply, and providing an output current as a charging current to a load via a power converter;

b) generating a first voltage signal by comparing a first reference voltage against a first detection signal that represents said input voltage, and determining an overload state of said external power supply;

c) generating a first current reference signal according to a second detection signal that represents said input current when said external power supply is determined to be in said overload state; and d) regulating said input current in accordance with said first current reference signal when said external power supply is determined to be in said overload state in order to exit said overload state to make said input current become less than a maximum value drawn from said external power supply.

13. The method of claim 12, wherein when said first detection signal is greater than said first reference voltage, said external power supply is determined to not be in said overload state, and said first reference voltage is maintained, and wherein when said first detection signal is less than said first reference voltage, said external power supply is determined to be in said overload state.

14. The method of claim 13, wherein generating said first current reference signal comprises:

a) generating said first current reference signal for a next control cycle according to a pre-stored digital value when said external power supply is not in said overload state; and b) subtracting a current regulation step length from said second detection signal to generate said first current reference signal for said next control cycle when said external power supply is in said overload state.

15. The method of claim 13, wherein generating said first current reference signal comprises:

a) generating said first current reference signal for a next control cycle according to a counting value stored in a down counter when said external power supply is not in said overload state; and b) performing, by a down counter, a subtraction operation in each clock cycle, and generating said first current reference signal for said next control cycle when said external power supply is in said overload state.

* * * * *